UNITED STATES PATENT OFFICE.

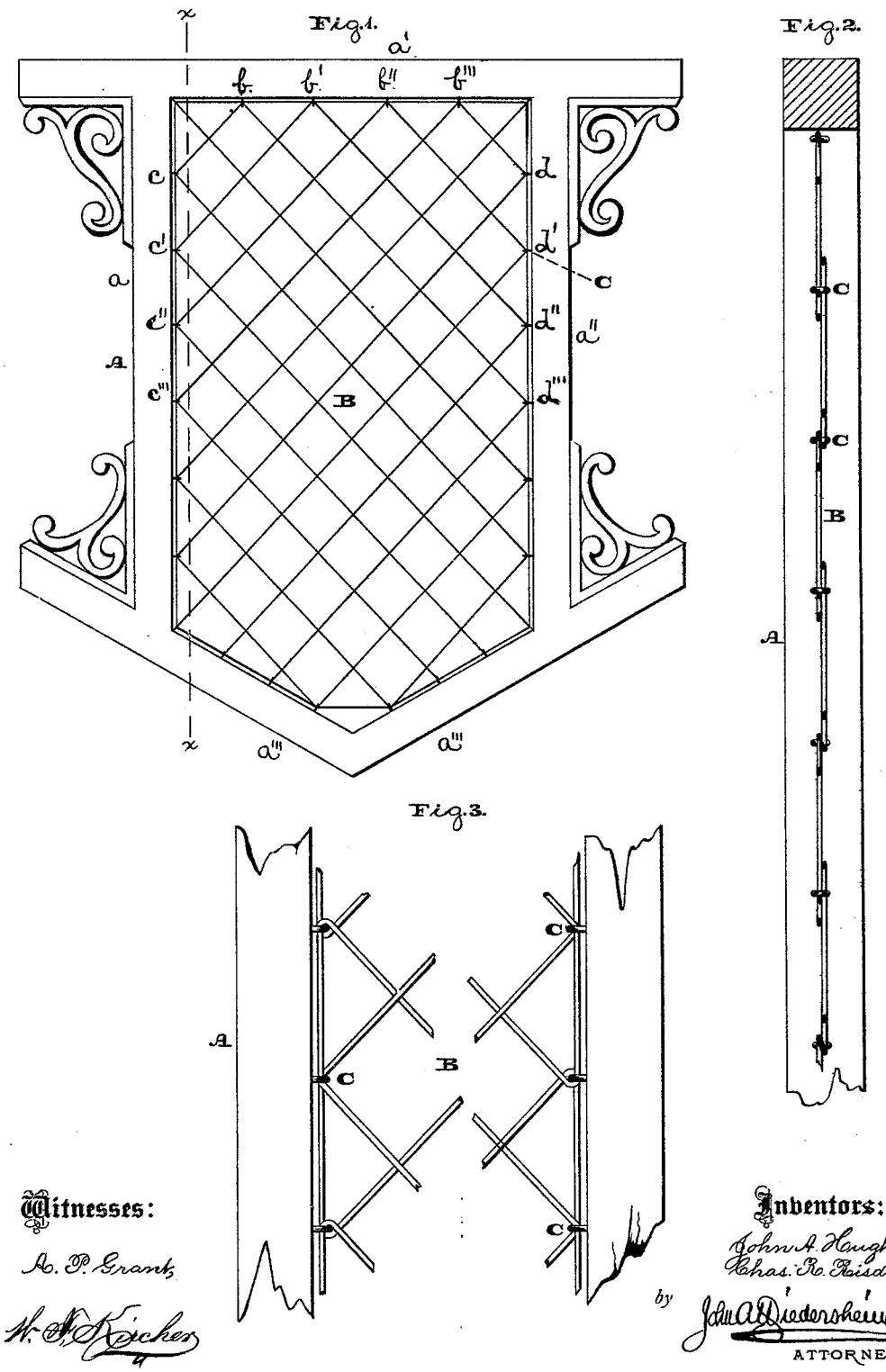

JOHN A. HUGHES AND CHARLES R. RISDON, OF PHILADELPHIA, PA.

IMPROVEMENT IN OPEN SIGNS.

Specification forming part of Letters Patent No. 213,426, dated March 18, 1879; application filed August 13, 1878.

*To all whom it may concern:*

Be it known that we, JOHN A. HUGHES and CHARLES R. RISDON, both of the city and county of Philadelphia and State of Pennsylvania, have invented a new and useful Improvement in Open Signs, which improvement is fully set forth in the following specification and accompanying drawings, in which—

Figure 1 is a face view of the sign embodying our invention. Fig. 2 is a vertical section thereof in line $x$ $x$, Fig. 1; and Fig. 3 is an enlarged view of a portion of Fig. 1.

Similar letters of reference indicate corresponding parts in the three figures.

Our invention consists in forming an open sign of cross wires or cords, which are connected to the hooks or eyes on the sides of the frame in such a manner that portions of the length of the wires or cords extend from the hooks along the inner sides of the frame, so as to brace the frame, hold the hooks, and strengthen the sign, and the hooks provide convenient and inexpensive means of attaching the wires or cords.

Referring to the drawings, A represents the frame of the sign, and B wires or cords, which are crossed and interlocked or reeved and connected to hooks or eyes C, inserted into or connected to the sides of the frame.

The end of the first wire is secured, say, to a hook, $b$, near one corner of the bar $a'$ of the frame A, passed thence to the adjacent side, $a$, of the frame under two hooks, $c$ $c'$, bent over the hook $c'$, then returned in a line parallel to the first, stretched to the bar $a'$, then under two hooks, $b'$ $b''$, on the bar $a'$, bent over the hook $b''$ and returned to the bar $a$, passed under two hooks, $c''$ $c'''$, there, and returned as before, and so on, throughout the length of the frame.

The end of the second wire is secured, say, to a hook, $d$, on the bar $a''$, passed then at right angles to the first wire to the adjacent side or bar, $a'$, of the frame, then under two hooks, $b'''$ $b''$, thereon, bent over the hook $b''$, and then back to the first side, $a''$, under the hooks $d'$ $d''$ thereon, bent over the hook $d''$ and returned to the side $a'$, and so on, until the frame is filled with this cross-wire as with the first wire.

It will be noticed that each hook or eye sustains two thicknesses of wire or cord, the result of the cross wires or cords meeting at said hook, and one of said cross wires or cords extends behind said hook along the frame to the hook above, and the other to the hook below, whereby a length of wire connects adjacent hooks, thus producing a disconnected length of wire or cord along each side of the frame, held, however, by the hooks and serving to brace the frame.

The provision of hooks or eyes affords simple and inexpensive means of attaching the wires or cords, as it is only necessary to drive the shanks of the hooks or eyes into the frame at proper intervals, and the subsequent reeving and connection of the wires are easy and quickly accomplished.

We are aware that cords have been run from sides of frames of other articles; but we are not aware that an open sign has had cords or wires reeved and connected in the manner hereinbefore set forth by us.

We are also aware that it is not new to form open signs of two frames, between which the ends of the open work are introduced and clamped. Such features are therefore disclaimed; but, Having fully described our invention, what we claim as new, and desire to secure by Letters Patent, is—

The combination, with the frame A and hooks C, of the diagonally-crossing wires or cords B, the two lengths whereof meet at each hook, and then separate and extend in opposite directions along the side of the frame to the adjacent hooks, substantially as and for the purpose set forth.

JOHN A. HUGHES.
CHAS. R. RISDON.

Witnesses:
JOHN A. WIEDERSHEIM,
JOHN A. BELL.